(12) United States Patent
Goetzinger et al.

(10) Patent No.: US 7,280,474 B2
(45) Date of Patent: Oct. 9, 2007

(54) WEIGHTED FAIR QUEUE HAVING ADJUSTABLE SCALING FACTOR

(75) Inventors: William John Goetzinger, Rochester, MN (US); Glen Howard Handlogten, Rochester, MN (US); James Francis Mikos, Rochester, MN (US); David Alan Norgaard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 10/015,760

(22) Filed: Nov. 1, 2001

(65) Prior Publication Data

US 2003/0081552 A1    May 1, 2003

(51) Int. Cl.
*H04L 12/26* (2006.01)
*H04L 12/56* (2006.01)
(52) U.S. Cl. .................................. 370/235; 370/412
(58) Field of Classification Search ............... 370/235, 370/230.1, 395.2, 395.4, 395.41, 395.42, 370/395.43, 412, 417, 418
See application file for complete search history.

(56) References Cited

U.S. PATENT DOCUMENTS

| | | | |
|---|---|---|---|
| 4,621,359 A | 11/1986 | McMillen | |
| 5,249,184 A * | 9/1993 | Woest et al. ............. | 370/402 |
| 5,490,141 A | 2/1996 | Lai et al. | |
| 5,548,590 A | 8/1996 | Grant et al. | |
| 5,629,928 A | 5/1997 | Calvignac et al. | |
| 5,650,993 A | 7/1997 | Lakshman et al. | |
| 5,742,772 A | 4/1998 | Sreenan | |
| 5,790,545 A | 8/1998 | Holt et al. | |
| 5,831,971 A | 11/1998 | Bonomi et al. | |
| 5,835,494 A | 11/1998 | Hughes et al. | |
| 5,844,890 A | 12/1998 | Delp et al. | |
| 5,850,399 A | 12/1998 | Ganmukhi et al. | |
| 5,905,730 A | 5/1999 | Yang et al. | |
| 5,926,459 A | 7/1999 | Lyles et al. | |
| 5,926,481 A | 7/1999 | Wang et al. | |
| 5,946,297 A | 8/1999 | Calvignac et al. | |
| 5,999,963 A | 12/1999 | Bruno et al. | |

(Continued)

FOREIGN PATENT DOCUMENTS

EP    0 859 492 A2    8/1998

(Continued)

OTHER PUBLICATIONS

U.S. Appl. No. 10/015,994, filed Nov. 1, 2001, titled "Weighted Fair Queue Serving Plural Output Ports".

(Continued)

*Primary Examiner*—Chi Pham
*Assistant Examiner*—Saba Tsegaye
(74) *Attorney, Agent, or Firm*—Dugan & Dugan, PC

(57) ABSTRACT

A scheduler for a network processor includes a scheduling queue in which weighted fair queuing is applied. The scheduling queue has a range R. Flows are attached to the scheduling queue at a distance D from a current pointer for the scheduling queue. The distance D is calculated for each flow according to the formula $D=((WF \times FS)/SF)$, where WF is a weighting factor applicable to a respective flow; FS is a frame size attributable to the respective flow; and SF is a scaling factor. The scaling factor SF is adjusted depending on a comparison of the distance D to the range R.

14 Claims, 8 Drawing Sheets

U.S. PATENT DOCUMENTS

| | | | |
|---|---|---|---|
| 6,014,367 A | 1/2000 | Joffe | |
| 6,018,527 A * | 1/2000 | Yin et al. | 370/395.41 |
| 6,028,842 A | 2/2000 | Chapman et al. | |
| 6,028,843 A | 2/2000 | Delp et al. | |
| 6,031,822 A | 2/2000 | Wallmeier | |
| 6,038,217 A | 3/2000 | Lyles | |
| 6,041,059 A | 3/2000 | Joffe et al. | |
| 6,052,751 A | 4/2000 | Runaldue et al. | 710/107 |
| 6,064,650 A | 5/2000 | Kappler et al. | |
| 6,064,677 A | 5/2000 | Kappler et al. | |
| 6,067,301 A | 5/2000 | Aatresh | |
| 6,072,772 A * | 6/2000 | Charny et al. | 370/229 |
| 6,072,800 A | 6/2000 | Lee | |
| 6,078,953 A | 6/2000 | Vaid et al. | |
| 6,081,507 A | 6/2000 | Chao et al. | |
| 6,092,115 A | 7/2000 | Choudhury et al. | |
| 6,094,435 A | 7/2000 | Hoffman et al. | |
| 6,101,193 A * | 8/2000 | Ohba | 370/429 |
| 6,104,700 A | 8/2000 | Haddock et al. | |
| 6,108,307 A | 8/2000 | McConnell et al. | |
| 6,122,673 A | 9/2000 | Basak et al. | |
| 6,144,669 A | 11/2000 | Williams et al. | |
| 6,157,614 A | 12/2000 | Pasternak et al. | |
| 6,157,649 A | 12/2000 | Peirce et al. | |
| 6,157,654 A | 12/2000 | Davis | |
| 6,160,812 A | 12/2000 | Bauman et al. | |
| 6,169,740 B1 | 1/2001 | Morris et al. | |
| 6,188,698 B1 | 2/2001 | Galand et al. | |
| 6,226,267 B1 | 5/2001 | Spinney et al. | |
| 6,229,812 B1 | 5/2001 | Parruck et al. | |
| 6,229,813 B1 | 5/2001 | Buchko et al. | |
| 6,236,647 B1 | 5/2001 | Amalfitano | |
| 6,246,692 B1 | 6/2001 | Dai et al. | |
| 6,259,699 B1 | 7/2001 | Opalka et al. | 370/398 |
| 6,266,702 B1 | 7/2001 | Darnell et al. | 709/236 |
| 6,356,546 B1 | 3/2002 | Beshai | |
| 6,389,019 B1 * | 5/2002 | Fan et al. | 370/395.42 |
| 6,389,031 B1 | 5/2002 | Chao et al. | 370/412 |
| 6,404,768 B1 | 6/2002 | Basak et al. | |
| 6,469,982 B1 | 10/2002 | Henrion et al. | |
| 6,481,251 B1 | 11/2002 | Meier et al. | |
| 6,563,829 B1 * | 5/2003 | Lyles et al. | 370/395.21 |
| 6,608,625 B1 * | 8/2003 | Chin et al. | 345/501 |
| 6,611,522 B1 | 8/2003 | Zheng et al. | 370/395.21 |
| 6,646,986 B1 | 11/2003 | Beshai | |
| 6,775,287 B1 | 8/2004 | Fukano et al. | 370/395.1 |
| 6,804,249 B1 | 10/2004 | Bass et al. | |
| 6,810,043 B1 | 10/2004 | Naven et al. | |
| 6,810,426 B2 | 10/2004 | Mysore et al. | |
| 6,813,274 B1 * | 11/2004 | Suzuki et al. | 370/412 |
| 6,832,261 B1 | 12/2004 | Westbrook et al. | 709/236 |
| 6,850,490 B1 * | 2/2005 | Woo et al. | 370/230 |
| 6,885,664 B2 | 4/2005 | Ofek et al. | |
| 6,888,830 B1 | 5/2005 | Snyder II et al. | |
| 6,891,835 B2 | 5/2005 | Kalkunte et al. | |
| 7,020,137 B2 | 3/2006 | Kadambi et al. | 370/389 |
| 2001/0004363 A1 | 6/2001 | Usukura | 370/417 |
| 2001/0012294 A1 | 8/2001 | Kadambi et al. | 370/391 |
| 2002/0003795 A1 | 1/2002 | Oskouy et al. | 370/389 |
| 2002/0024830 A1 | 2/2002 | Yoneda | |
| 2002/0136230 A1 | 9/2002 | Dell et al. | 370/416 |
| 2002/0163922 A1 | 11/2002 | Dooley et al. | 370/412 |
| 2002/0181455 A1 | 12/2002 | Norman et al. | |
| 2003/0050954 A1 | 3/2003 | Tayyar et al. | |
| 2003/0588798 | 3/2003 | Rumph | |

FOREIGN PATENT DOCUMENTS

| | | |
|---|---|---|
| EP | 0957602 A2 | 11/1999 |
| EP | 0 989 770 A1 | 3/2000 |
| EP | 1 049 352 A2 | 11/2000 |
| EP | 1 061 763 A2 | 12/2000 |
| JP | 04-094240 | 3/1992 |
| JP | 2000183886 | 6/2000 |
| JP | 2000295247 | 10/2000 |
| JP | 2001007822 | 12/2000 |
| WO | WO99/35792 A1 | 7/1999 |
| WO | WO99/53647 A2 | 10/1999 |
| WO | WO99/53648 A2 | 10/1999 |
| WO | 01/20876 A1 | 3/2001 |

OTHER PUBLICATIONS

U.S. Appl. No. 10/016,518, filed Nov. 1, 2001, titled "Weighted Fair Queue Having Extended Effective Range".

U.S. Appl. No. 10/002,085, filed Nov. 1, 2001, titled "Empty Indicators for Weighted Fair Queues".

U.S. Appl. No. 10/004,373, filed Nov. 1, 2001, titled "QoS Scheduler and Method for Implementing Peak Service Distance Using Next Peak Service Time Violated Indication".

U.S. Appl. No. 10/002,416, filed Nov. 1, 2001, titled "QoS Scheduler and Method for Implementing Quality of Service with Aging Time Stamps".

U.S. Appl. No. 10/004,440, filed Nov. 1, 2001, titled "QoS Scheduler and Method for Implementing Quality of Service with Cached Status Array".

U.S. Appl. No. 10/004,217, filed Nov. 1, 2001, titled "QoS Scheduler and Method for Implementing Quality of Service Anticipating the End of a Chain of Flows".

U.S. Appl. No. 10/102,343, filed Mar. 20, 2002, "Network Processor Having Fast Flow Queue Disable Process".

U.S. Appl. No. 10/102,166, filed Mar. 20, 2002, "Method and Apparatus for Improving the Fairness of New Attaches to a Weighted Fair Queue in a Quality of Service (QoS) Scheduler".

Abstract of Publication entitled "Design of packet-fair queuing schedulers using a RAM-based searching engine" by HJ Chao et al, IEEE Journal on Selected Areas in Communications, vol. 17, No. 6, pp. 1105-1126, Jun. 1999.

Lyons et al., "Estimating Clock Speeds for the ATMSWITCH Architecture", Proc. Networks '99 (The Third New Zealand ATM and Broadband Workshop), Jan. 21-22, 1999, pp. 39-53.

* cited by examiner

WEIGHTED FAIR QUEUE HAVING ADJUSTABLE SCALING FACTOR

CROSS REFERENCE TO RELATED PATENT APPLICATIONS

The present application is related to the following U.S. patent applications, each of which is hereby incorporated by reference herein in its entirety:

U.S. patent application Ser. No. 10/016,518, filed Nov. 1, 2001, titled "WEIGHTED FAIR QUEUE HAVING EXTENDED EFFECTIVE RANGE";

U.S. patent application Ser. No. 10/015,994, filed Nov. 1, 2001, titled "WEIGHTED FAIR QUEUE SERVING PLURAL OUTPUT PORTS";

U.S. patent application Ser. No. 10/002,085, filed Nov. 1, 2001, titled "EMPTY INDICATORS FOR WEIGHTED PAIR QUEUES";

U.S. patent application Ser. No. 10/004,373, filed Nov. 1, 2001, titled "QoS SCHEDULER AND METHOD FOR IMPLEMENTING PEAK SERVICE DISTANCE USING NEXT PEAK SERVICE TIME VIOLATED INDICATION" now U.S. Pat. No. 6,973,036 issued on Dec. 6, 2005;

U.S. patent application Ser. No. 10/002,416, filed Nov. 1, 2001, titled "QoS SCHEDULER AND METHOD FOR IMPLEMENTING QUALITY OF SERVICE WITH AGING STAMPS"

U.S. patent application Ser. No. 10/004,440, filed Nov. 1, 2001, titled "QoS SCHEDULER AND METHOD FOR IMPLEMENTING QUALITY OF SERVICE WITH CACHED STATUS ARRAY" now U.S. Pat. No. 7,046,676 issued on May 16, 2006; and U.S. patent application Ser. No. 10/004,217, filed Nov. 1, 2001, titled "QoS SCHEDULER AND METHOD FOR IMPLEMENTING QUALITY OF SERVICE ANTICIPATING THE END OF A CHAIN OF FLOWS" now U.S. Pat. No. 6,982,986 issued on Jan. 3, 2006.

FIELD OF THE INVENTION

The present invention is concerned with data and storage communication systems and is more particularly concerned with a scheduler component of a network processor.

BACKGROUND OF THE INVENTION

Data and storage communication networks are in widespread use. In many data and storage communication networks, data packet switching is employed to route data packets or frames from point to point between source and destination, and network processors are employed to handle transmission of data into and out of data switches.

FIG. 1 is a block diagram illustration of a conventional network processor in which the present invention may be applied. The network processor, which is generally indicated by reference numeral 10, may be constituted by a number of components mounted on a card or "blade". Within a data communication network, a considerable number of blades containing network processors may be interposed between a data switch and a data network.

The network processor 10 includes data flow chips 12 and 14. The first data flow chip 12 is connected to a data switch 15 (shown in phantom) via first switch ports 16, and is connected to a data network 17 (shown in phantom) via first network ports 18. The first data flow chip 12 is positioned on the ingress side of the switch 15 and handles data frames that are inbound to the switch 15.

The second data flow chip 14 is connected to the switch 15 via second switch ports 20 and is connected to the data network 17 via second network ports 22. The second data flow chip 14 is positioned on the egress side of the switch 15 and handles data frames that are outbound from the switch 15.

As shown in FIG. 1, a first data buffer 24 is coupled to the first data flow chip 12. The first data buffer 24 stores inbound data frames pending transmission of the inbound data frames to the switch 15. A second data buffer 26 is coupled to the second data flow chip 14, and stores outbound data frames pending transmission of the outbound data frames to the data network 17.

The network processor 10 also includes a first processor chip 28 coupled to the first data flow chip 12. The first processor chip 28 supervises operation of the first data flow chip 12 and may include multiple processors. A second processor chip 30 is coupled to the second data flow chip 14, supervises operation of the second data flow chip 14 and may include multiple processors.

A control signal path 32 couples an output terminal of second data flow chip 14 to an input terminal of first data flow chip 12 (e.g., to allow transmission of data frames therebetween).

The network processor 10 further includes a first scheduler chip 34 coupled to the first data flow chip 12. The first scheduler chip 34 manages the sequence in which inbound data frames are transmitted to the switch 15 via first switch ports 16. A first memory 36 such as a fast SRAM is coupled to the first scheduler chip 34 (e.g., for storing data frame pointers and flow control information as described further below). The first memory 36 may be, for example, a QDR (quad data rate) SRAM.

A second scheduler chip 38 is coupled to the second data flow chip 14. The second scheduler chip 38 manages the sequence in which data frames are output from the second network ports 22 of the second data flow chip 14. Coupled to the second scheduler chip 38 are at least one and possibly two memories (e.g., fast SRAMs 40) for storing data frame pointers and flow control information. The memories 40 may, like the first memory 36, be QDRs. The additional memory 40 on the egress side of the network processor 10 may be needed because of a larger number of flows output through the second network ports 22 than through the first switch ports 16.

FIG. 2 schematically illustrates conventional queuing arrangements that may be provided for a data flow chip/scheduler pair (either the first data flow chip 12 and the first scheduler chip 34 or the second data flow chip 14 and the second scheduler chip 38) of the network processor 10 of FIG. 1. In the particular example illustrated in FIG. 2, the first data flow chip 12 and the first scheduler chip 34 are illustrated, but a very similar queuing arrangement may be provided in connection with the second data flow chip 14 and the second scheduler chip 38. In the queuing arrangement for the first data flow chip 12 and the first scheduler chip 34, incoming data frames (from data network 17) are buffered in the input data buffer 24 associated with the first data flow chip 12 (FIG. 1). Each data frame is associated with a data flow or "flow". As is familiar to those who are skilled in the art, a "flow" represents a one-way connection between a source and a destination.

Flows with which the incoming data frames are associated are enqueued in a scheduling queue 42 maintained in the first scheduler chip 34. The scheduling queue 42 defines a sequence in which the flows enqueued therein are to be serviced. The particular scheduling queue 42 of interest in connection with the present invention is a weighted fair queue which arbitrates among flows entitled to a "best effort" or "available bandwidth" Quality of Service (QoS).

As shown in FIG. 2, the scheduling queue 42 is associated with a respective output port 44 of the first data flow chip 12. It is to be understood that the output port 44 Is one of the first switch ports 16 illustrated in FIG. 1. (However, if the data flow chip/scheduler pair under discussion were the egress side data flow chip 14 and scheduler chip 38, then the output port 44 would be one of the network ports 22.) Although only one scheduling queue 42 and one corresponding output port 44 are shown, it should be understood that in fact there may be plural output ports and corresponding scheduling queues each assigned to a respective port. (However, according to an alternative embodiment, disclosed in co-pending patent application Ser. No. 10/015,994, filed Nov. 1, 2001, a group of output ports may be associated with each scheduling queue 42. This co-pending patent application is incorporated herein by reference.)

Although not indicated in FIG. 2, the first scheduler chip 34 also includes flow scheduling calendars which define output schedules for flows which are entitled to a scheduled QoS with guaranteed bandwidth, thus enjoying higher priority than the flows governed by the scheduling queue 42.

The memory 36 associated with the first scheduler chip 34 holds pointers ("frame pointers") to locations in the first data buffer 24 corresponding to data frames associated with the flows enqueued in the scheduling queue 42. The memory 36 also stores flow control information, such as information indicative of the QoS to which flows are entitled.

When the scheduling queue 42 indicates that a particular flow enqueued therein is the next to be serviced, reference is made to the frame pointer in the memory 36 corresponding to the first pending data frame for the flow in question and the corresponding frame data is transferred from the first data buffer 24 to an output queue 46 associated with the output port 44.

A more detailed representation of the scheduling queue 42 is shown in FIG. 3. As noted above, the scheduling queue 42 is used for weighted fair queuing of flows serviced on a "best effort" basis. In a particular example of a scheduling queue as illustrated in FIG. 3, the scheduling queue 42 has 512 slots (each slot represented by reference numeral 48). Other numbers of slots may be employed. In accordance with conventional practice, flows are enqueued or attached to the scheduling queue 42 based on a formula that takes into account both a length of a data frame associated with a flow to be enqueued and a weight which corresponds to a QoS to which the flow is entitled.

More specifically, the queue slot in which a flow is placed upon enqueuing is calculated according to the formula $CP+((WF \times FS)/SF)$, where CP is a pointer ("current pointer") that indicates a current position (the slot currently being serviced) in the scheduling queue 42; WF is a weighting factor associated with the flow to be enqueued, the weighting factor having been determined on the basis of the QoS to which the flow is entitled; FS is the size of the current frame associated with the flow to be enqueued; and SF is a scaling factor chosen to scale the product (WF×FS) so that the resulting quotient falls within the range defined by the scheduling queue 42. (In accordance with conventional practice, the scaling factor SF is conveniently defined as a integral power of 2—i.e., $SF=2^n$, with n being a positive integer—so that scaling the product (WF×FS) is performed by right shifting.) With this known weighted fair queuing technique, the weighting factors assigned to the various flows in accordance with the QoS assigned to each flow govern how close to the current pointer of the queue each flow is enqueued. In addition, flows which exhibit larger frame sizes are enqueued farther from the current pointer of the queue, to prevent such flows from appropriating an undue proportion of the available bandwidth of the queue. Upon enqueuement, data that identifies a flow (the "Flow ID") is stored in the appropriate queue slot 48.

In some applications, there may be a wide range of data frame sizes associated with the flows, perhaps on the order of about 64 bytes to 64 KB, or three orders of magnitude. It may also be desirable to assign a large range of weighting factors to the flows so that bandwidth can be sold with a great deal of flexibility and precision. In practice, however, it is difficult to predict at the time of designing or initializing the scheduler chip 34 what will be the characteristics of the data packets handled by the scheduler chip 34. Consequently, it is difficult to anticipate over what range of values the product (WF×FS) will fall during operation of the network processor 10. As a result, the scaling factor SF may be chosen to be a value that is too large or too small. If the value of SF is chosen to be too small, then the enqueuement distance $D=((WF \times FS)/SF)$ may overrun the range R of the scheduling queue 42. If this occurs, an error condition may result, or the enqueuement distance D may be reduced to equal the range R of the scheduling queue 42, resulting in a failure to properly perform the desired weighted fair queuing.

If the scaling factor SF is chosen to be too large, then all of the flows to be enqueued may be attached relatively close to the current pointer of the scheduling queue 42. As a result, the full resources of the range of the scheduling queue 42 may not be used, again possibly resulting in a failure to precisely perform the desired weighted fair queuing.

It would accordingly be desirable to overcome the potential drawbacks of setting the scaling factor SF either too low or too high.

SUMMARY OF THE INVENTION

According to an aspect of the invention, a scheduler for a network processor is provided. The scheduler includes a scheduling queue in which weighted fair queuing is applied. The scheduling queue has a range R. Flows are attached to the scheduling queue at a distance D from a current pointer for the scheduling queue. The distance D is calculated for each flow according to the formula $D=((WF \times FS)/SF)$, where WF is a weighting factor applicable to a respective flow; FS is a frame size attributable to the respective flow; and SF is a scaling factor. The scaling factor SF is adjusted depending on a result of comparing the distance D to the range R.

In at least one embodiment, the scaling factor SF may be increased if D is greater than R. For example, the scaling factor SF may be increased if D exceeds R in regard to a predetermined number of calculations of D.

In one or more embodiments, the scaling factor SF may be decreased if D is less than R/2. For example, the scaling factor SF may be decreased if D is less than one-half R in regard to a predetermined number of calculations of D.

In some embodiments, the scaling factor SF may equal $2^n$, where n is a positive integer. For example, n may be incremented to increase SF, or may be decremented to decrease SF.

According to another aspect of the invention, a method of managing a scheduling queue in a scheduler for a network processor is provided. The scheduling queue has a range R.

Flows are attached to the scheduling queue at a distance D from a current pointer for the scheduling queue, the distance D being calculated for each flow according to the formula D=((WF×FS)/SF), where WF is a weighting factor applicable to a respective flow, FS is a frame size attributable to the respective flow, and SF is a scaling factor. The method includes calculating the distance D with respect to a particular flow to be enqueued, comparing the distance D to the range R, and adjusting the scaling factor SF based on a result of the comparing step.

In a scheduler provided in accordance with the invention, an initial value at which the scaling factor SF is set may be adjusted adaptively during operation of the scheduler to reflect actual experience with data handled by the scheduler, so that the scaling factor SF assumes a value that is suitable for using the range R of the scheduling queue and/or such that the enqueuement distance D does not overrun the range R of the scheduling queue.

Other objects, features and advantages of the present invention will become more fully apparent from the following detailed description of exemplary embodiments, the appended claims and the accompanying drawings.

DETAILED DESCRIPTION

Figure 1:
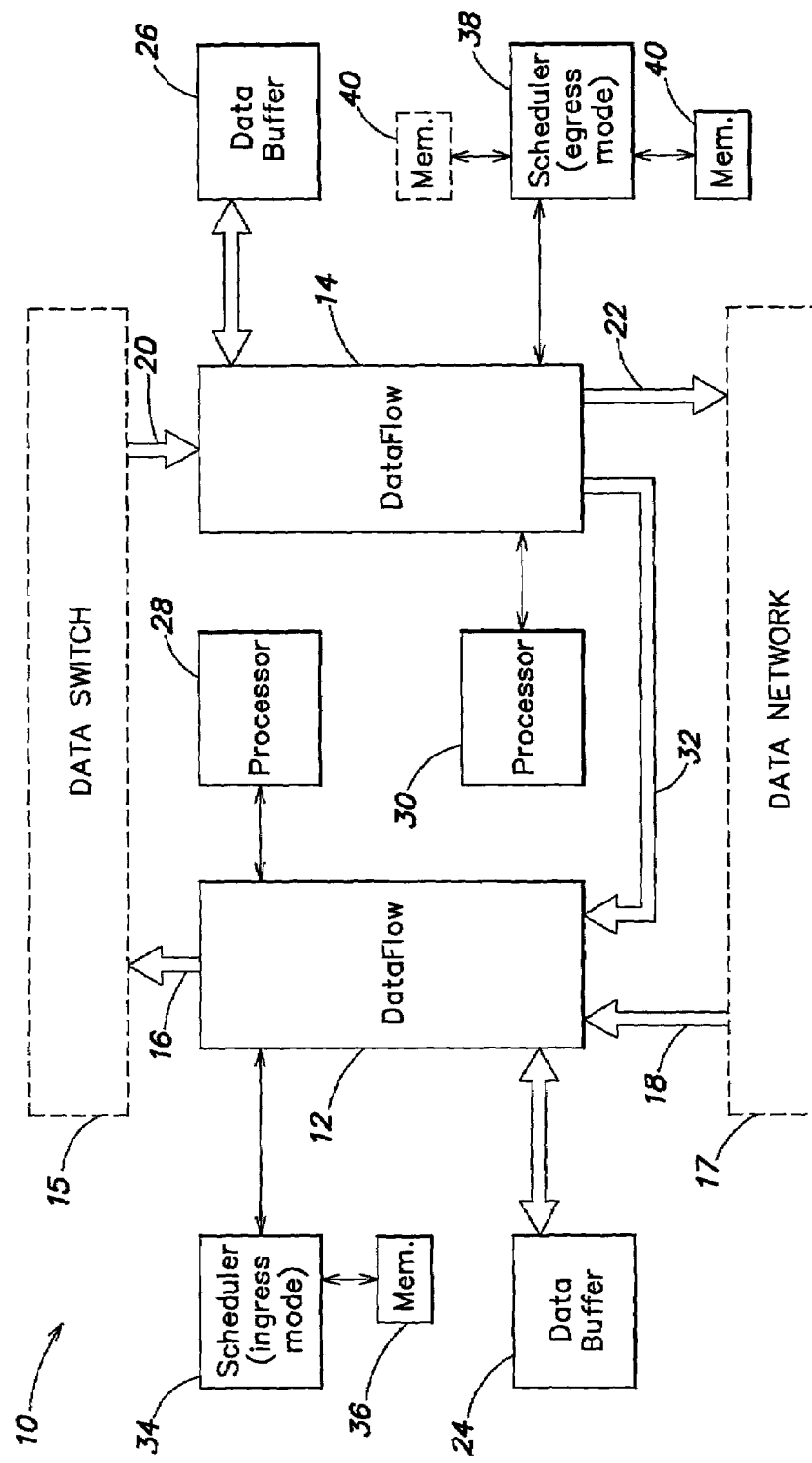
FIG. 1 is a block diagram of a conventional network processor in which the present invention may be applied.

Adjustment of a scaling factor SF of a scheduler in accordance with the invention will now be described, initially with reference to FIG. 4 and the conventional network processor 10 of FIGS. 1-3. It will be understood that the present invention may be employed with any suitable conventional network processor.

Figure 2:
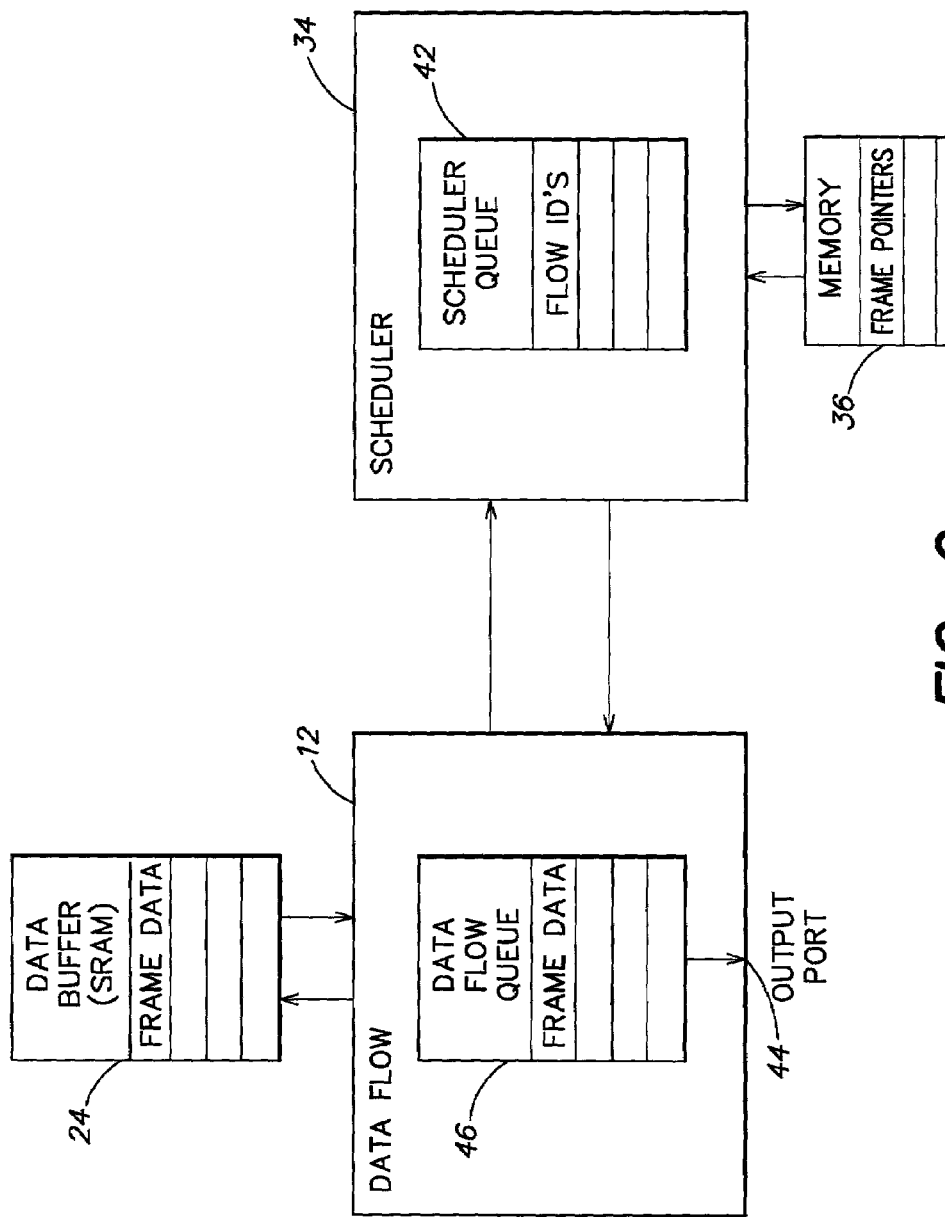
FIG. 2 is a block diagram representation of conventional queuing arrangements provided in a data flow chip/scheduler pair included in the network processor of FIG. 1.
Figure 3:
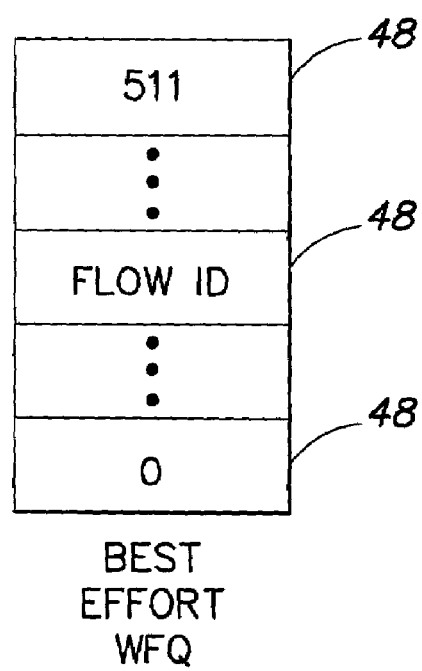
FIG. 3 is a pictorial representation of a weighted fair queuing scheduling queue provided in accordance with conventional practices.
Figure 4:
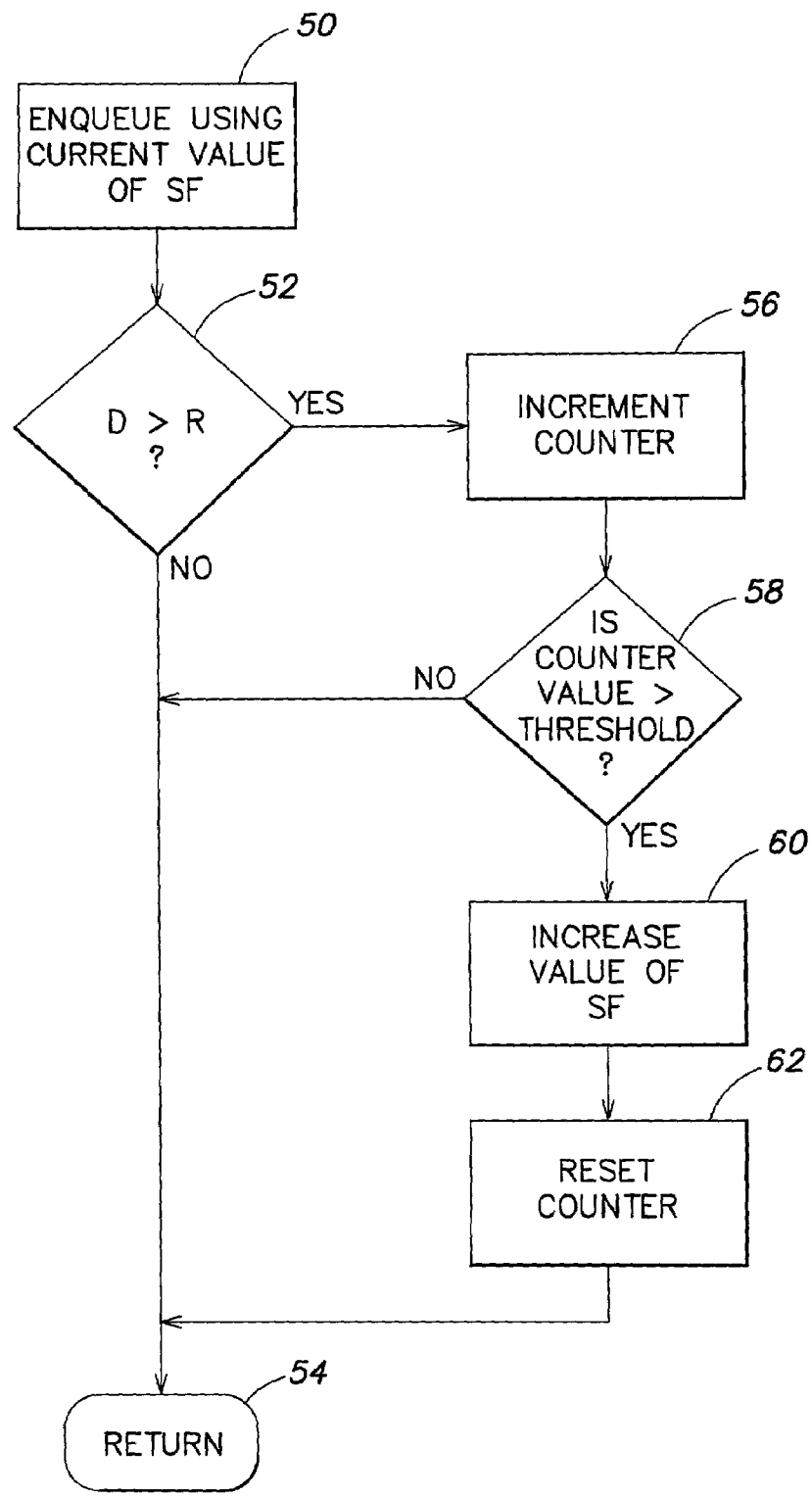
FIG. 4 is a flow chart that illustrates a process provided in accordance with the invention to increase the value of a scaling factor when a range of a scheduling queue is overrun.
Figure 7B:
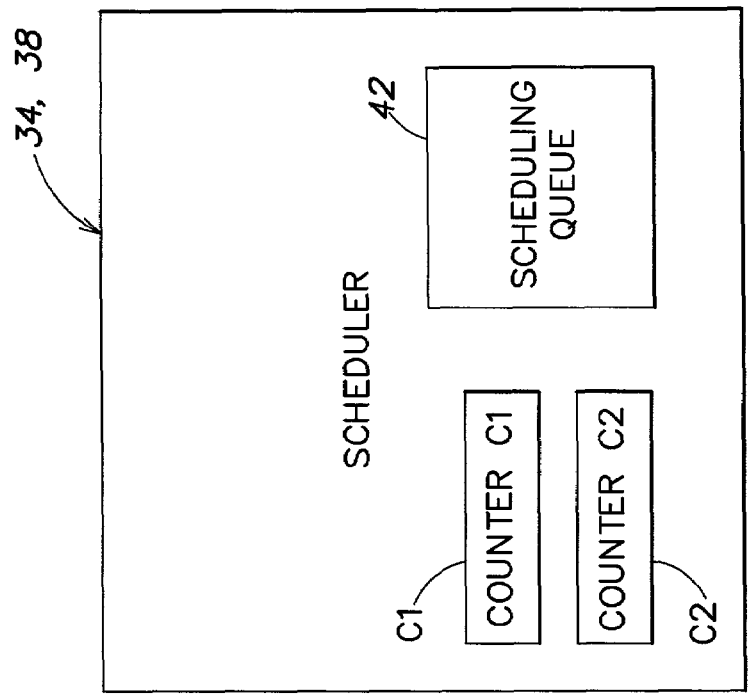
FIG. 7B is a block diagram of an inventive scheduler for use with the processes of FIGS. 6A and 6B.
Figure 7A:
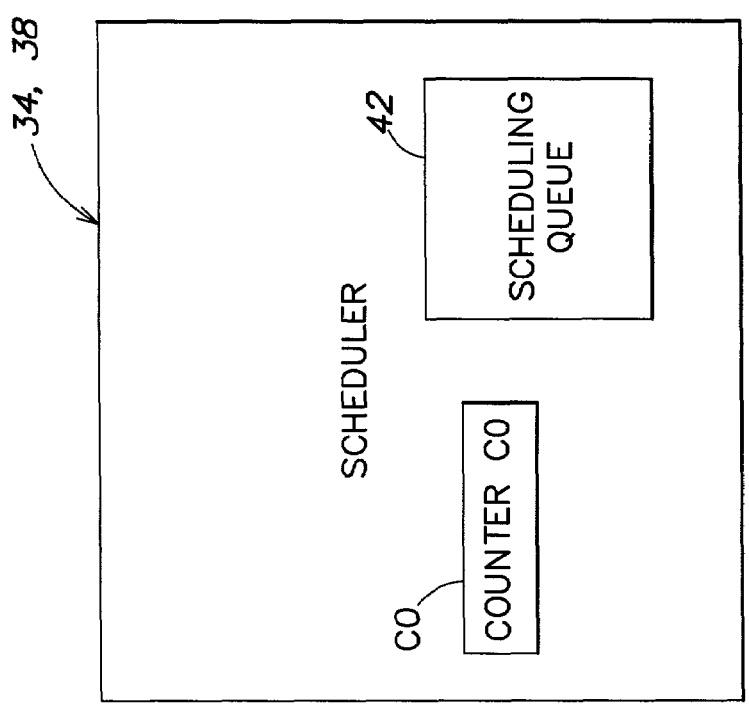
FIG. 7A is a block diagram of an inventive scheduler for use with the processes of FIGS. 4 and 5.

FIG. 4 is a flow chart that illustrates a process provided in accordance with the invention for increasing the value of a scaling factor SF in response to overrunning the range R of the scheduling queue 42 (FIG. 2). In the particular example of the scheduling queue 42 described above, the range R of the scheduling queue 42 corresponds to the number of slots 48, i.e. R=512. Other ranges may be employed. In accordance with the inventive process of FIG. 4, and as described further below, the schedulers 34 and/or 38 may be provided with a counter C0 as shown in FIG. 7A. The counter C0 may comprise any conventional counter, whether hardware or software based.

Initially in FIG. 4 is block 50, at which a flow is attached to the scheduling queue 42 using the current value of the scaling factor SF. That is, the enqueuement distance D is calculated according to the conventional formula D=((WF×FS)/SF). Enqueuement can occur in one of two ways. The first way is a "new attach" situation, in which, for a flow having no frames corresponding to it, a new frame arrives, and the flow is attached to the scheduling queue 42 in response to arrival of the new frame. The second way is a "reattach" situation, in which a flow is already enqueued in the scheduling queue 42 and is picked as a winner (because it is closest to the head of the queue and no higher priority service intervenes), a frame is dispatched with respect to the flow, and the flow is rescheduled on the scheduling queue 42 because there is at least one more frame to be dispatched from the flow.

Following block 50 is decision block 52. In decision block 52 it is determined whether the enqueuement distance D exceeded (overran) the range R of the scheduling queue 42. If not, the procedure of FIG. 4 simply returns (block 54) so that the scheduling queue 42 may perform conventional queue operations (not described).

However, if it is determined at decision block 52 that the enqueuement distance D overran the range R of the scheduling queue 42, then block 56 follows decision block 52. At block 56, a value of the counter C0 (FIG. 7A) is incremented. Any suitable counter may be employed (e.g., a hardware or software based counter).

Following block 56 is decision block 58. At decision block 58, it is determined whether the incremented counter value exceeds a predetermined threshold. This threshold (and other thresholds discussed below) can be set in a variety of ways. For example, the threshold can be determined by software if the software has information concerning the flows/frames to be handled. If so, the scaling factor SF can be set accurately based on the flows/frames that are expected. The software would then set the threshold to handle flows that misbehave. For example, if it is not desired to tolerate an occasional frame that causes the enqueuement distance D to exceed the range R, then the threshold may be set to zero. If system requirements allow some misbehaving flows to be tolerated, then the threshold may be set higher.

If the software has no information concerning the flows/frames that to be handled, then an arbitrary value for the initial value of the scaling factor SF can be chosen, and the threshold can be set so that the scaling factor SF is increased rapidly if the range R of the scheduling queue 42 is exceeded. (A threshold for decreasing the scaling factor SF, to be discussed below, may be set so that the scaling factor SF is decreased slowly if the flows are all being scheduled in the lower part of the scheduling queue 42.) These threshold values would allow the system to quickly adapt to unknown input.

If a positive determination is made at decision block 58, the procedure returns (block 54). However, if it is determined at decision block 58 that the predetermined threshold is exceeded by the incremented counter value, then block 60 follows decision block 58.

At block 60 the value of the scaling factor SF is increased. This may be done in a number of ways. For example, if the scaling factor SF is expressed as an integral power of 2 (i.e., $2^n$), then the scaling factor SF may be doubled by incrementing the value of n (e.g., via a left shifting operation as previously described, such as left shifting a register (not shown) in which the scaling factor is stored). It is contemplated, alternatively, to increase SF by a factor other than two.

Following block 60 is block 62 at which the counter C0 is reset. The procedure of FIG. 4 then returns (block 54) so that the scheduling queue 42 may perform conventional queue operations (not described).

It will be appreciated that the procedure of FIG. 4 operates so that when the range of the scheduling queue 42 is overrun a certain number of times (e.g., as set by the predetermined threshold), the value of the scaling factor SF is increased, to reduce the likelihood of overrunning the range of the scheduling queue 42 in the future. Thus the initial value of the scaling factor SF can be set at a low value, and the scheduler 34 (FIG. 2) can be allowed, in operation, to increase the value of the scaling factor SF to adapt to the actual characteristics of the data traffic, so that, after an initial period, overrunning of the range of the scheduling queue 42 does not occur.

Figure 5:
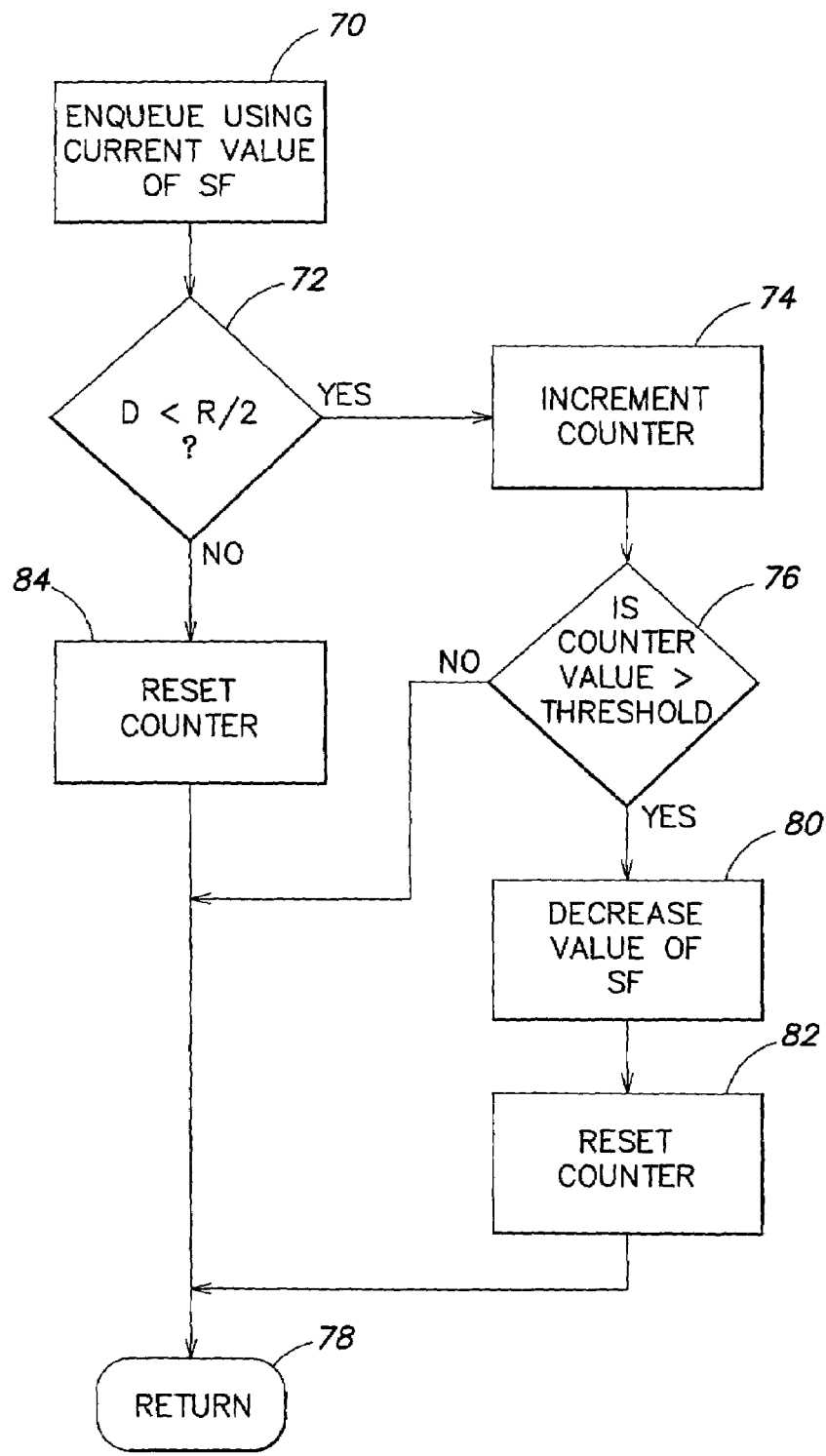
FIG. 5 is a flow chart that illustrates a process provided in accordance with the invention to decrease the value of a scaling factor when a range of a scheduling queue is underutilized.

FIG. 5 is a flow chart that represents a procedure provided in accordance with the invention for decreasing the value of the scaling factor SF of the scheduler 34 of FIG. 2 in response to underutilization of the range of the scheduling queue 42. As with the procedure of FIG. 4, the procedure of FIG. 5 may be employed with other schedulers and/or scheduling queues, and employs the counter C0 (FIG. 7A).

The procedure of FIG. 5 begins with block 70 which is like block 50 of FIG. 4 (e.g., a flow is attached to the scheduling queue 42 using the current value of the scaling factor SF during calculation of the enqueuement distance D). Following block 70 is a decision block 72. At decision block 72 it is determined whether the enqueuement distance D calculated in block 70 is less than one-half the range R of the scheduling queue 42. If the enqueuement distance D is found to be less than one-half the range R of the scheduling queue 42, then block 74 follows decision block 72. (If the scaling factor SF is decreased by a factor other than two, then the enqueuement distance D is advantageously to be compared to something other than one-half of the range R. For example, if the scaling factor SF is to be decreased by a factor of 4, then the enqueuement distance D may be compared to one-fourth of the range R.)

At block 74 a value of the counter C0 is incremented. Following block 74 is decision block 76 at which it is determined whether the incremented counter value is greater than a predetermined threshold. If not, the procedure of FIG. 5 returns (block 78). However, if it is found at decision block 76 that the incremented counter value exceeds the predetermined threshold, then block 80 follows decision block 76.

At block 80 the value of the scaling factor SF is decreased. The decreasing of the value of the scaling factor SF may occur in a number of ways. For example, if the scaling factor SF is expressed as a power of 2 (i.e., $2^n$) then the scaling factor SF may be halved by decrementing n (e.g., by right shifting a register (not shown) in which the scaling factor is stored). It is contemplated, alternatively, to decrease the scaling factor SF by a factor other than two.

Following block 80 is block 82, at which the counter C0 is reset. The procedure of FIG. 5 then returns (block 78).

Considering again decision block 72, if it is determined at that decision block that the enqueuement distance D is not less than one-half the range R of the scheduling queue 42, then block 84 follows decision block 72. At block 84 the counter C0 is reset, and the procedure of FIG. 5 then returns (block 78). The counter C0 is reset because, if the upper part of the scheduling queue 42 is ever used, then the scaling factor SF will not be too large.

With the procedure of FIG. 5, the value of the scaling factor SF can be set to a high value, in anticipation of a wide range of enqueuement distances that may be encountered during processing of data frames. In the event that the high value of the scaling factor leads to underutilization of the range of the scheduling queue, the procedure of FIG. 5 will adaptively decrease the value of the scaling factor to a value that is well suited to the actual characteristics of the data that is being processed.

Figure 6A:
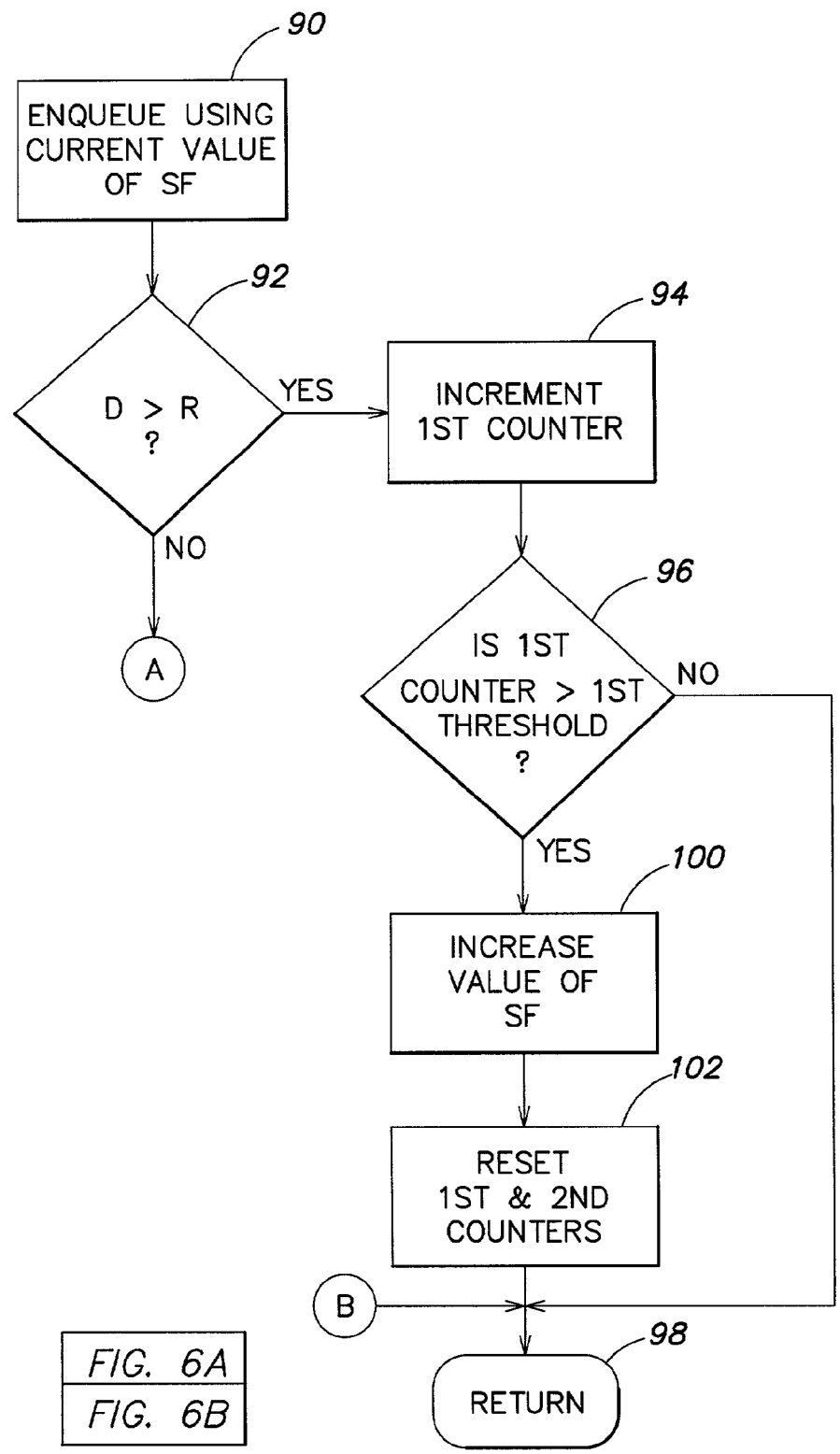
FIGS. 6A and 6B together form a flow chart that illustrates a process provided in accordance with the invention to increase and/or decrease a scaling factor in response to overrunning or underutilizing a range of a scheduling queue.
Figure 6B:
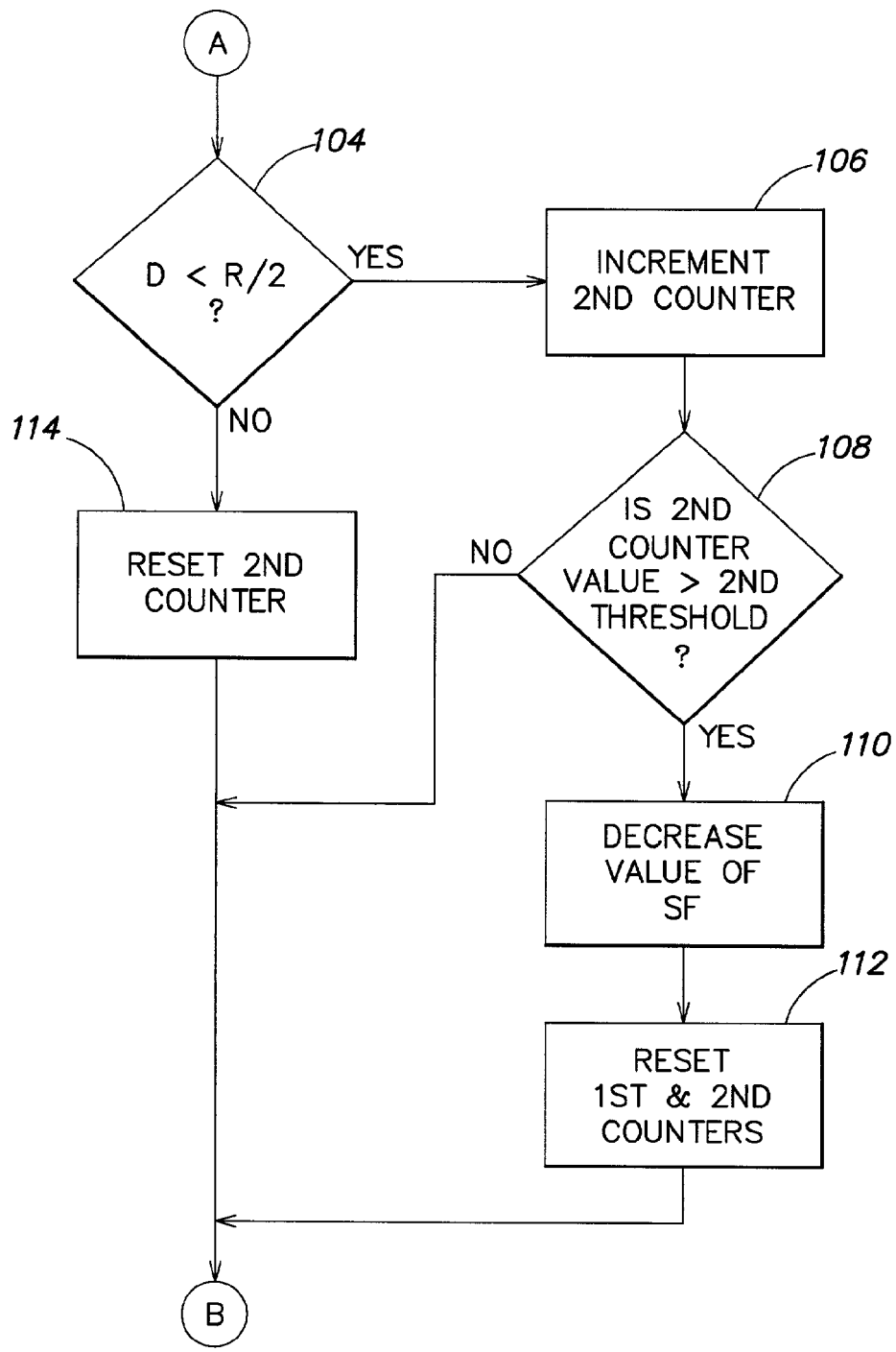

FIGS. 6A and 6B together form a flow chart that illustrates a procedure provided in accordance with the invention and by which the value of the scaling factor SF of the scheduler 42 of FIG. 2 can be either increased or decreased to adapt to characteristics of the data handled by the network processor 10. In accordance with the inventive process of FIGS. 6A and 6B, and as described further below, the schedulers 34 and/or 38 may be provided with a first counter C1 and a second counter C2 as shown in FIG. 7B. The counters C1 and C2 may comprise any conventional counters, whether hardware or software based.

Initially in the procedure of FIGS. 6A and 6B is a block 90, which entails the same activity as block 50 of FIG. 4 (e.g., a flow is attached to the scheduling queue 42 using the current value of the scaling factor SF during calculation of the enqueuement distance D). Following block 90 is a decision block 92 at which it is determined whether the enqueuement distance D is greater than the range R of the scheduling queue 42. If it is determined at decision block 92 that the enqueuement distance D exceeded the range R of the scheduling queue 42, then a value of the first counter C1 (FIG. 7B) is incremented (block 94). Following block 94 is a decision block 96. At decision block 96 it is determined whether the value of the first counter C1 is greater than a first threshold. If not, then the procedure returns (block 98). However, if it is determined at decision block 96 that the value of the first counter C1 exceeds the first threshold, then the value of the scaling factor SF is increased (block 100). This may be done, for example, by incrementing the value of n, where SF is expressed as $2^n$, or by any other technique.

Following block 100 is block 102. At block 102 the first counter C1 is reset. The second counter C2 (FIG. 7B) also is reset. (As will be seen, the second counter C2 is involved with determining whether to decrease the value of the scaling factor SF in response to underutilization of the range R of the scheduling queue 42.) Following block 102 the procedure of FIGS. 6A and 6B returns (block 98).

Considering again decision block 92, if it is determined at decision block 92 that the enqueuement distance D is not greater than the range R of the scheduling queue 42, then decision block 104 (FIG. 6B) follows decision block 92. At decision block 104 it is determined whether the enqueuement distance D is less than one-half of the range R of the scheduling queue 42. If the enqueuement distance D is less than one-half the range R, then block 106 follows decision block 104.

At block 106, the value of the second counter C2 is incremented. Following block 106 is decision block 108, at which it is determined whether the value of the second counter C2 is greater than a second threshold. If not, the procedure returns (block 98). However, if it is determined at decision block 108 that the value of the second counter C2 is greater than the second threshold, then block 110 follows decision block 108. At decision block 110 the value of the scaling factor SF is decreased. This may be done, for example, by decrementing n where SF is expressed as $2^n$, or by any other technique.

Following block 110 is block 112. At block 112 the first and second counters C1, C2 are reset. The procedure then returns (block 98).

Considering again decision block 104, if it is determined at decision block 104 that the enqueuement distance D is not less than one-half the range R of the scheduling queue 42, then block 114 follows decision block 104. At block 114 the second counter C2 is reset. The procedure of FIGS. 6A and 6B then returns (block 98).

In one embodiment of the procedure of FIGS. 6A and 6B, the scaling factor SF may initially be set at $2^7$ (i.e., 128). The first threshold may be set to be 0 (i.e., the scaling factor SF is increased each time the range R is overrun), and the second threshold may be set to be 8 (i.e. 9 consecutive enqueuements in the lower half of the scheduling queue 42 result in decreasing the scaling factor SF).

In the procedure of FIGS. 6A and 6B, the scaling factor SF may be set at an intermediate value or an arbitrary value, and the scheduler 34 (when configured in accordance with the present invention) then operates to adapt the scaling factor SF, by either increasing or decreasing the value of the scaling factor SF, as required in response to characteristics of the data being processed. This aspect of the invention also makes it unnecessary to attempt to predict the characteristics of the data to be processed upon initially setting the value of the scaling factor.

A scheduler configured in accordance with the present invention can also adapt to changes in a stream of data by increasing or decreasing the scaling factor SF as the situation requires. Thus the scheduler may, for example, increase the scaling factor SF during an initial period of operation, then may decrease the scaling factor SF in response to a change in the pattern of data traffic, and further may increase the scaling factor SF again in response to another change in the pattern of data traffic.

Noting again that plural scheduling queues (e.g., 64) may be maintained in the inventive scheduler, it should be understood that respective scaling factors SF of the scheduling queues are advantageously to be adjusted independently of one another. Consequently, in a typical situation in accordance with the invention, different values of scaling factors are applicable to different scheduling queues at any given time.

The processes of FIG. 4-6B may be implemented in hardware, software or a combination thereof. In at least one embodiment of the invention, the processes of FIGS. 4-6B are implemented in hardware employing a suitable combination of conventional logic circuitry such as adders, comparators, selectors, etc. Such hardware may be located, for example, within the scheduler 34 and/or the scheduler 38 (FIG. 2). A person of ordinary skill in the art may develop logic circuitry capable of performing the inventive processes described with reference to FIGS. 4-6B. In a software embodiment of the invention, the processes of FIGS. 4-6B may comprise one or more computer program products. Each inventive computer program product may be carried by a medium readable by a computer (e.g., a carrier wave signal, a floppy disk, a hard drive, a random access memory, etc.).

The foregoing description discloses only exemplary embodiments of the invention; modifications of the above disclosed apparatus and methods which fall within the scope of the invention will be readily apparent to those of ordinary skill in the art. According to one alternative embodiment, a scheduling queue may have plural subqueues of different ranges and resolutions, according to an invention disclosed in co-pending patent application Ser. No. 10/016,518, filed Nov. 11, 2001. This co-pending patent application is incorporated herein by reference.

Moreover, in the above description, the invention has been implemented in a separate scheduler chip associated with a network processor. However, it is also contemplated to implement the invention in a scheduler circuit that is implemented as part of a data flow chip or as part of a processor chip.

Furthermore, in accordance with above-disclosed embodiments of the invention, reduction of the scaling factor SF has been triggered by underutilization of the range of the scheduling queue, where underutilization has been effectively defined as attaching flows repeatedly in the lower half of the scheduling queue. It is alternatively contemplated, however, to define underutilization of the range of the scheduling queue in other ways. For example, underutilization may be deemed to have occurred upon repeated attachment of flows in the lower third or lower quarter of the scheduling queue.

Accordingly, while the present invention has been disclosed in connection with exemplary embodiments thereof, it should be understood that other embodiments may fall within the spirit and scope of the invention, as defined by the following claims.

The invention claimed is:

1. A method of managing a scheduling queue in a scheduler for a network processor, the scheduling queue having a range R, flows being attached to the scheduling queue at a distance D from a current pointer for the scheduling queue, the distance D being calculated for each flow according to the formula D=((WF×FS)/SF), where:
   WF is a weighting factor applicable to a respective flow;
   FS is a frame size attributable to the respective flow; and
   SF is a scaling factor;
   the method comprising:
   calculating the distance D with respect to a particular flow to be enqueued;
   comparing the distance D to the range R;
   adjusting the scaling factor SF based on a result of the comparing step; and
   managing the scheduling queue based on the adjusted scaling factor SF.

2. The method of claim 1, wherein the scaling factor SF is increased if the comparing step determines that D>R.

3. The method of claim 1, wherein the scaling factor SF is decreased if the comparing step determines that D<R/2.

4. The method of claim 1, wherein SF=2n, n being a positive integer, and the adjusting step includes incrementing or decrementing n.

5. A method of managing a scheduling queue in a scheduler for a network processor, the scheduling queue having a range R, flows being attached to the scheduling queue at a distance D from a current pointer for the scheduling queue, the distance D being calculated for each flow according to the formula D=((WF×FS)/SF), where:
   WF is a weighting factor applicable to a respective flow;
   FS is a frame size attributable to the respective flow; and
   SF is a scaling factor;
   the method comprising:
   calculating the distance D with respect to a particular flow to be enqueued;
   comparing the distance D to the range R;
   incrementing a counter if the comparing step determines that D>R;
   increasing SF if the incremented counter exceeds a threshold; and managing the scheduling queue based on the scaling factor SF.

6. The method of claim 5, wherein SF=2n, n being a positive integer, and the increasing step includes incrementing n.

7. A method of managing a scheduling queue in a scheduler for a network processor, the scheduling queue having a range R, flows being attached to the scheduling queue at a distance D from a current pointer for the scheduling queue, the distance D being calculated for each flow according to the formula D=((WF×FS)/SF), where:
  WF is a weighting factor applicable to a respective flow;
  FS is a frame size attributable to the respective flow; and
  SF is a scaling factor;
  the method comprising:
  calculating the distance D with respect to a particular flow to be enqueued;
  comparing the distance D to the range R;
  incrementing a counter if the comparing step determines that D<R/2;
  decreasing SF if the incremented counter exceeds a threshold; and
  managing the scheduling queue based on the scaling factor SF.

8. The method of claim 7, further comprising:
  clearing the counter if the comparing step determines that D >R/2.

9. The method of claim 7, wherein SF=2n, n being a positive integer, and the decreasing step includes decrementing n.

10. A method of managing a scheduling queue in a scheduler for a network processor, the scheduling queue having a range R, flows being attached to the scheduling queue at a distance D from a current pointer for the scheduling queue, the distance D being calculated for each flow according to the formula D=((WF×FS)/SF), where:
  WF is a weighting factor applicable to a respective flow;
  FS is a frame size attributable to the respective flow; and
  SF is a scaling factor;
  the method comprising:
  calculating the distance D with respect to a particular flow to be enqueued;
  comparing the distance D to the range R;
  incrementing a first counter if the comparing step determines that D>R;
  increasing SF if the incremented first counter exceeds a first threshold;
  incrementing a second counter if the comparing step determines that D<R/2;
  decreasing SF if the incremented second counter exceeds a second threshold; and
  managing the scheduling queue based on the scaling factor SF.

11. The method of claim 10, further comprising:
  clearing the second counter if the comparing step determines that D>R/2.

12. The method of claim 10, wherein SF=2n, n being a positive integer, the increasing step includes incrementing n, and the decreasing step includes decrementing n.

13. A method of managing a scheduling queue in a scheduler for a network processor, the scheduling queue having a range R, flows being attached to the scheduling queue at a distance D from a current pointer for the scheduling queue, the distance D being calculated for each flow according to the formula D=((WF×FS)/SF), where:
  WF is a weighting factor applicable to a respective flow;
  FS is a frame size attributable to the respective flow; and
  SF is a scaling factor;
  the method comprising:
  calculating the distance D with respect to a particular flow to be enqueued;
  comparing the distance D to the range R;
  increasing SF if the distance D exceeds the range R; and
  managing the scheduling queue based on the scaling factor SF.

14. A method of managing a scheduling queue in a scheduler for a network processor, the scheduling queue having a range R, flows being attached to the scheduling queue at a distance D from a current pointer for the scheduling queue, the distance D being calculated for each flow according to the formula D=((WF×FS)/SF), where:
  WF is a weighting factor applicable to a respective flow;
  FS is a frame size attributable to the respective flow; and
  SF is a scaling factor;
  the method comprising:
  calculating the distance D with respect to a particular flow to be enqueued;
  comparing the distance D to the range R;
  increasing SF if the distance D exceeds the range R;
  incrementing a counter if the comparing step determines that D<R/2;
  decreasing SF if the incremented counter exceeds a threshold; and
  managing the scheduling queue based on the scaling factor SF.

* * * * *